United States Patent [19]

Patel

[11] Patent Number: 4,791,033

[45] Date of Patent: Dec. 13, 1988

[54] FUEL CELL SYSTEM
[75] Inventor: Pinakin Patel, Danbury, Conn.
[73] Assignee: Energy Research Corporation, Danbury, Conn.
[21] Appl. No.: 174,075
[22] Filed: Mar. 28, 1988
[51] Int. Cl.[4] .............................................. H01M 8/06
[52] U.S. Cl. ........................................ 429/19; 420/20; 420/26; 420/17; 420/16
[58] Field of Search ........................ 429/16, 17, 19, 20, 429/26, 14, 46, 30, 34

[56] References Cited

U.S. PATENT DOCUMENTS 3,410,783 11/1968 Tomter ................................ 204/266
3,446,674 4/1969 Giner ................................... 136/86
4,532,192 7/1985 Baker et al. ......................... 429/19
4,620,914 11/1986 Abens et al. ........................ 204/265

Primary Examiner—Anthony Skapars
Attorney, Agent, or Firm—Robin, Blecker & Daley

[57] ABSTRACT

In a fuel cell system employing an internally reforming fuel cell and a gas transfer device for recycling hydrogen gas in the fuel cell exhaust back to the fuel cell, the supply fuel is passed through the transfer device so as to allow controllable transfer of water with the transferred hydrogen, thereby providing a stream automatically containing water necessary for the steam reforming reaction in the fuel cell.

15 Claims, 1 Drawing Sheet

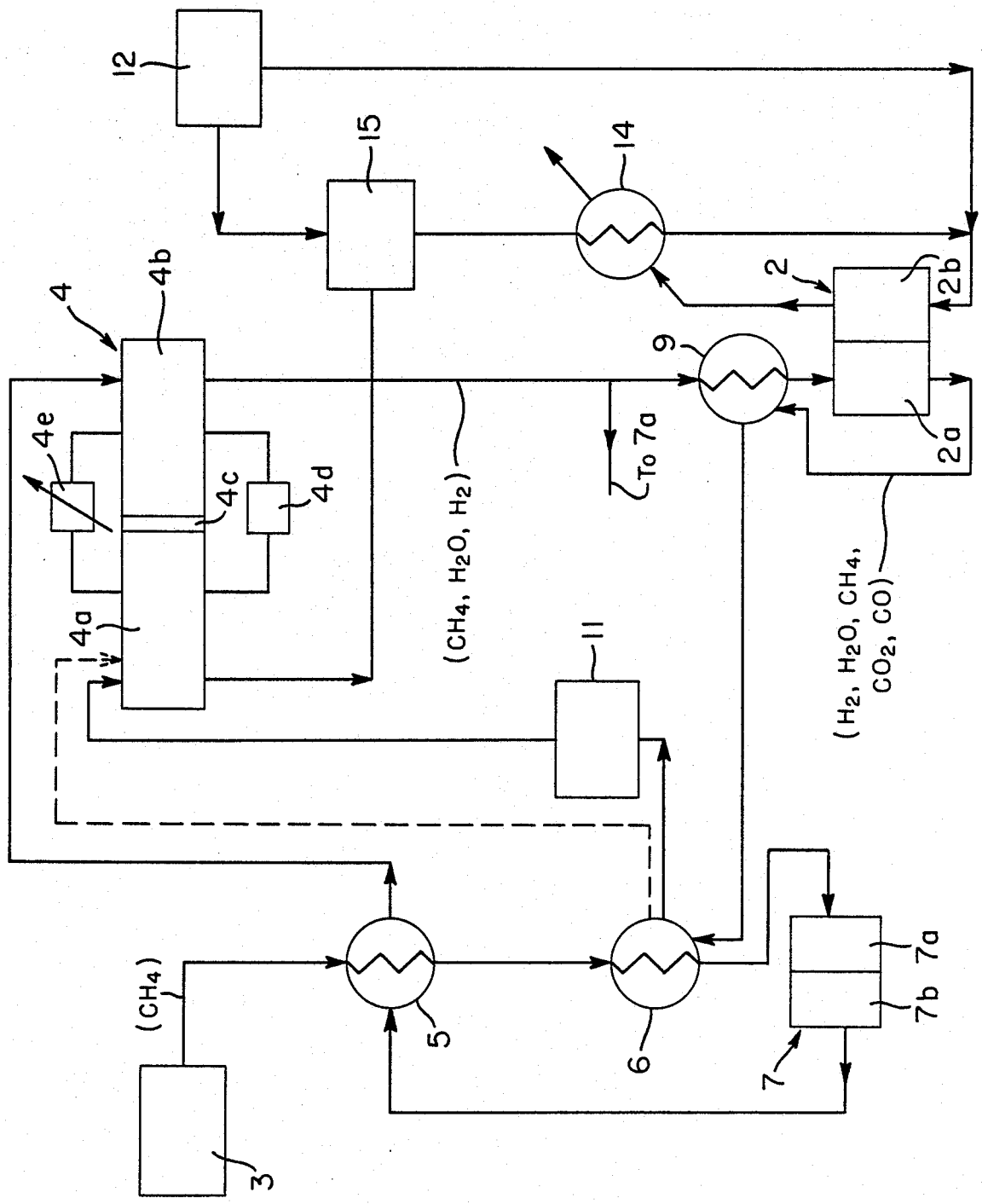

FUEL CELL SYSTEM

BACKGROUND OF THE INVENTION

This invention relates to fuel cell systems and, in particular, to fuel cell systems which employ internal reforming.

In U.S. Pat. No. 4,532,192, assigned to the same assignee hereof, there is disclosed an internally reforming fuel cell system which is adapted to provide maximum utilization of the hydrogen fuel process gas. This is accomplished by incorporating in the system a transfer device which includes anode and cathode means and to whose anode means is fed the exhaust gas from the anode compartment of the fuel cell of the system. This exhaust gas typically comprises unused hydrogen, water, small amounts of carbon monoxide and methane (where methane is the fuel supply) and carbon dioxide.

As a result of applying a voltage across the anode and cathode means of the transfer device, the hydrogen in the applied exhaust is transferred to the cathode means of the device to the exclusion of the other constituents in the exhaust. This transferred hydrogen forms a first stream and this first stream is then combined with the methane fuel supply and the combined gases fed to the anode compartment of the fuel cell for steam reforming and electrochemical reaction.

The system of the '192 patent also makes use of the constituents remaining after extraction of the of the hydrogen. These constituents form a second stream which is first passed through a condenser to remove the water constituent. The removed water is then used to aid in the steam reforming process. This is accomplished by combining the water with the first stream and adding the combined gases to the methane fuel supply.

The second stream absent the water is then fed to a burner and burned with oxidant from the oxidant supply to remove any residual hydrogen. The resultant oxidant gas, which now includes substantial amounts of carbon dioxide, is then fed to the cathode compartment of the fuel cell as oxidant process gas.

The aforesaid system of the '192 patent is beneficial in realizing increased utilization of hydrogen in the fuel cell exhaust and in making use of the water and carbon dioxide in such exhaust in a manner which enhances system performance. However, the system requires the use of bulky condensers and heat exchangers which if eliminated or even reduced in size and number would further increase the benefits of the system.

It is therefore an object of the present invention to provide an improved internal reforming fuel cell system of the above type.

It is a further object of the present invention to provide an internal reforming fuel cell system of the above type in which the requirements for condensers and heat exchangers is reduced.

SUMMARY OF THE INVENTION

In accordance with the principles of the present invention, the above and other objects are realized in an internal reforming fuel cell system of the above type wherein the fuel of the fuel supply is fed through the cathode means of the transfer device, before being fed to the anode compartment of the fuel cell. It has been found that by so feeding the cathode means with the fuel, a portion of the water as well as substantially all the hydrogen in the anode exhaust (the first exhaust) being fed to the cathode means is coupled therefrom to the anode means of the transfer device, the amount of water being controllable in dependence on the fuel supplied.

As a result, the stream from the cathode exhaust of the transfer device (the first stream) now itself contains water for promoting the required steam reforming at the anode compartment of the fuel cell when the first stream, which now also includes the fuel supply, is applied thereto. The previously used condenser for deriving water from the remaining constituents of the anode means of the transfer device (the second stream) for combining with the first stream is thereby eliminated or, if not eliminated, is of a significantly smaller size. Futhermore, the supplying of fuel from the fuel supply to the cathode means of the transfer device reduces the power requirements of the device. The overall cost of the system is thereby reduced while system efficiency is increased.

In a further aspect of the invention, the fuel cell system is provided with equipment for removing impurities in the fuel supply (mainly sulfur where methane is the fuel) and the transfer device is operated at a temperature that more closely approaches that of the purifying equipment. The requirements on the heat exchangers normally used to bring the fuel supply within the operating range of the transfer device are therefore also reduced. Furthermore, the hydrogen required for sulfur impurity removal may be supplied from the transfer device, thereby avoiding the need for a separate hydrogen source.

BRIEF DESCRIPTION OF THE DRAWINGS

The above and other features and aspects of the present invention will become more apparent upon reading the following detailed description in conjunction with the accompanying drawing in which the sole FIGURE shows an internally reforming fuel cell system in accordance with the principles with the present invention.

DETAILED DESCRIPTION

FIG. 1 shows a fuel cell system 1 in accordance with the principles of the present invention. The fuel cell system comprises a high temperature fuel cell 2 (i.e., one operating at a temperature above 600 Degrees F.) having an anode compartment 2a and a cathode compartment 2b.

The cell 2 is also of the internal reforming type which means that it internally reforms the hydrocarbon fuel from the fuel supply 3 to form hydrogen process gas. For the purposes of discussion, it is assumed that this reforming occurs in the anode compartment 2a, but it could also occur in other places in the cell such as, for example, in a compartment in isolation from the anode compartment. Also for purposes of discussion, it is further assumed that the fuel cell 2 is a molten carbonate fuel cell, but the principles of the invention are intended to be applicable to other high temperature cells, such as, for example, solid oxide fuel cells.

The supply 3 delivers fuel which is carried by the system 1 to the anode compartment 2a of the fuel cell 2. While the fuel from the supply 3 can be any hydrocarbon feed such as, for example, methane, methanol, ethanol or natural gas, it is assumed, in the present case to be methane. The methane in the anode compartment 2 undergoes reforming as above-described and electrochemical reaction. This results in an anode tail or first exhaust gas containing unused hydrogen, water, small amounts of methane and carbon monoxide and substantial amounts of carbon dioxide.

As in the '192 patent, the system 1 carries this first exhaust gas to the anode means 4a of a transfer device 4. The latter device may be of a type as disclosed in the '192 patent and/or in U.S. Pat. No. 4,620,914, also assigned to the same assignee, hereof. In the present case, the device 4 is a phosphoric acid electrochemical transfer device and includes, in addition to the anode means 4a, a cathode means 4b, a phosphoric acid electrolyte 4c, a voltage source 4d for applying a voltage across the anode and cathode means 4a and 4b and a variable load 4e.

As discussed in the '192 patent, in passing through the anode means 4a of the transfer device 4, the hydrogen content of the exhaust, to the exclusion of the other constituents in the exhaust, is transferred to the cathode means 4b of the cell to form a first stream. This first stream is then recycled by the system 1 back to the anode compartment 2a of the fuel cell 2, whereby the previously unused hydrogen is now made available to the cell 2 for electrochemical conversion. Increased utilization of the hydrogen is thereby realized.

In the '192 patent, the remaining constituents delivered from the anode means 4a of the tranfer device after transfer of the hydrogen form a second stream. This second stream is passed through a condenser to remove water and a portion of the water is combined with the first stream for delivery to the anode compartment 2a of the fuel cell 2 for aiding in the reforming of the fuel and to prevent carbon deposition.

In accordance with the principles of the present invention, the need for such condenser of the '192 system is eliminated or if not eliminated the requirements of the condenser are greatly reduced. More particularly, in accord with the invention, this is accomplished by controllably causing the water in the aforementioned first exhaust coupled to the anode means 4a to be transferred to the cathode means 4b along with the hydrogen. Specifically, it has been found that by passing the fuel from the fuel supply 3 through the cathode means 4a during the hydrogen transfer process, the desired water transfer occurs in a controllable fashion in dependence on the amount of fuel.

In the system 1 of the present invention, the first stream from the cathode means 4b of the transfer device 4 thus comprises previously unused hydrogen, water and fuel. When this stream is thus delivered to the anode compartment 2a of the fuel cell 2, the desired water for aiding in the reforming of the accompanying fuel is, therefore, automatically present in the stream. Removal of water from the second stream from the anode means 4a and the condenser required for this purpose, as above-mentioned, are hence no longer needed.

As shown in the figure, in the present illustrative embodiment of the system 1, the fuel from the supply 3 is applied to the the anode means 4a of the transfer device 4 after it has been heated, purified and then cooled to be at a temperature suitable for the transfer device. In particular, the fuel is passed through a first heat exchanger 5, a second heat exchanger 6, a fuel purifier 7, back through the first heat exchanger 5 and then to the anode means 4a.

Where, as in the present illustrative embodiment, the fuel is methane, the purifier 7 is primarily adapted to remove the sulfur impurities from the supply fuel. Typically, the purifier may comprise a conventional hydrodesulfurization (HDS) unit 7a wherein organic sulfurs (e.g., phiophones and mercapten) are converted by hydrogen to inorganic sulfurs (e.g., hydrogen sulfide) followed by a conventional clean up unit 7b utilizing zinc oxide for removing the inorganic sulfurs. Advantageously, in the present system, hydrogen for the HDS unit 7a is derived from the gas stream leaving the cathode means 4b of the transfer device.

As can be appreciated, following the path of the fuel, the fuel from the supply 3 is heated by previously purified fuel in the heat exchanger 5, the latter purified fuel, in turn, being reduced in temperature so that its temperature is now compatible with the transfer device 4. The heated impure fuel is then further heated in the heat exchanger 6 so that it is brought to a temperature required by the fuel purifier 7. From the purifier 7, the purified fuel as above-described is cooled in heat exchanger 5 and then passed to the anode means 4a of the transfer device 4.

The heat for the impure fuel passing through the heat exchanger 6 is derived from the first exhaust from the anode compartment 2a. This exhaust is passed through the exchanger 6 to also bring its temperature down to a level compatible with the transfer device 4. After passage through the exchanger 6, the first exhaust can either be directly applied to the anode means 4a of the transfer device 4 (shown by the dotted path) or can be first passed through a shift converter 11 wherein the carbon monoxide in the stream is converted to hydrogen and water.

Prior to being applied to the heat exchanger 6, the first exhaust is initially cooled by passing it through another heat exchanger 9. In the latter heat exchanger, the exhaust gives up heat to the first stream from the cathode means 4b of the transfer device 4 so as to raise the temperature of this stream prior to entry of the stream into the anode compartment 2a of the cell 2.

To complete the description of the system 1, the remaining constituents in the anode means 4a, after the water and the hydrogen transfer, form a second stream. The second stream is applied to a burner 15 where the constitutents in the stream are burned with air from the oxidant supply 12. Advantageously, prior removal of water from the second stream in the transfer device facilitates burner operation and improves oxidant composition. As a result, carbon dioxide production in the burner is also facilitated.

The resultant stream, which is now rich in carbon dioxide, is then passed through a heat exchanger 14 where it is cooled by the exhaust from the cathode compartment 2b. The cooled stream is then recycled back to the cathode compartment were it is combined with air from the oxidant supply 12. Advantageously, carbon dioxide transfer to the cathode compartment from the cooled stream is also enhanced, due to the above-mentioned prior removal of water from the stream by the transfer device.

As indicated above, in the present system, passing the fuel supply through the cathode means 4b of the transfer device 4 allows for elimination of the water recovery equipment previously used to derive water for the reforming reaction in the fuel cell 2. The passage of the fuel through the cathode means 4b of the transfer device 4 is further advantageous because it is believed to lower the so called "NERNST potential" and, therefore, the power requirements of the the device. The overall system 1 hence requires less equipment and energy.

As can be appreciated, the particular amount of water transferred to the cathode means 4b will depend upon the the steam requirement necessary to prevent carbon formation and to enable the reforming reaction taking place in the anode compartment 2a of the fuel cell 2. A desired steam-to-carbon ratio may typically be 1 and the amount of water would in such case be adjusted via the amount of supply fuel to achieve this ratio.

In a further aspect of the present invention, the system 1 can be additionally adapted to further reduce the amount of equipment needed. More particularly, the system 1 can be operated such that the operating temperature of the tranfer device 4 is raised above about 500 degrees F. so as to more closely approximate the operating temperature of the fuel purifier 7. By then slightly lowering the the operating temperature of the purifier 7 to about 500 to 600 Degrees F., the two operating temperatures will be sufficiently close to allow use in the system of only the two heat exchangers 5 and 6 in the branch of the system from the fuel supply through the purifier 7 to the transfer device 4, thereby reducing the fuel preheating load.

Again, therefore, significant simplification of the system results. In addition, by raising the operating temperature of the transfer device 4, its efficiency and resistance to carbon monoxide poisoning will be increased.

In all cases it is understood that the above-identified arrangements are merely illustrative of the many possible specific embodiments which represent applications of the present invention. Numerous and varied other arrangements can be readily devised in accordance with the principles of the present invention without departing with the spirit and scope of the invention.

What is claimed is:

1. A fuel cell system adapted to receive a hydrocarbon fuel from a fuel supply, said fuel cell system comprising:
   a fuel cell including: an anode compartment adapted to convey a fuel process gas stream and developing a first exhaust including hydrogen and water; a cathode compartment adapted to receive oxidant process gas and developing a second exhaust; and internal reforming means adapted to receive a mixture of said fuel and water and to steam reform the hydrocarbon content of said fuel to produce said fuel process gas stream;
   transfer means comprising: anode means for receiving said first exhaust; cathode means; means for applying a voltage across said cathode and anode means; and means for supplying hydrocarbon fuel from said fuel supply to said cathode means; said transfer means coupling water in said first exhaust in said anode means to said cathode means controllably in dependence on the supply of fuel to said cathode means and coupling hydrogen in said first exhaust in said anode means to said cathode means, the constituents in said cathode means including said applied fuel and coupled hydrogen and water forming a first stream and the remaining constituents in said anode means forming a second stream;
   and means for coupling said first stream to said internal steam reforming means.

2. A fuel cell system in accordance with claim 1 wherein:
   said steam reforming means is incorporated into said anode compartment.

3. A fuel cell system in accordance with claim 1 further comprising:
   means for removing impurities from said fuel from said fuel supply;
   means for coupling the purified fuel to said cathode means.

4. A fuel cell system in accordance with claim 3 wherein: said impurities in said fuel include sulfur.

5. A fuel cell system in accordance with claim 4 wherein:
   said impurity removing means receives a portion of said first stream.

6. A fuel cell system in accordance with claim 3 further comprising:
   first heat exchange means for placing the fuel from said fuel supply in heat exchange with said purified fuel;
   second heat exchange means following said first heat exchange means for placing said fuel from said fuel supply in heat exchange with said first exhaust.

7. A fuel cell system in accordance with claim 6 further comprising:
   third heat exchange means for placing said first stream in heat exchange with said first exhaust prior to said first exhaust undergoing heat exchange in said second heat exchange means.

8. A fuel cell system in accordance with claim 7 further comprising:
   a burner for receiving said second stream and fresh supply of oxidant;
   and means for coupling the output of said burner to said cathode compartment.

9. A fuel cell system in accordance with claim 8 further comprising:
   fourth heat exchange means for placing said second exhaust in heat exchange with the output of said burner.

10. A fuel cell system in accordance with claim 7 further comprising;
    a shift reactor for converting carbon monoxide in said first exhaust to carbon dioxide and hydrogen.

11. A fuel cell system in accordance with claim 3 wherein; said transfer device is an electrochemical cell.

12. A fuel cell system in accordance with claim 11 wherein: said electrochemical cell is operated at a temperature above about 500 degrees F.

13. A fuel cell system in accordance with claim 12 wherein:
    said electrochemical cell is a phosphoric acid electrochemical cell.

14. A fuel cell system in accordance with claim 1 wherein;
    said fuel cell is one of a molten carbonate fuel cell and a solid oxide fuel cell.

15. A fuel cell system in accordance with claim 1 wherein: said hydrocarbon fuel is methane.

* * * * *